United States Patent
Giger et al.

(10) Patent No.: US 9,377,303 B2
(45) Date of Patent: Jun. 28, 2016

(54) SURVEYING APPLIANCE AND METHOD HAVING A TARGETING FUNCTIONALITY WHICH IS BASED ON THE ORIENTATION OF A REMOTE CONTROL UNIT AND IS SCALABLE

(75) Inventors: Kurt Giger, Rüthi (CH); Christian Schorr, St. Gallen (CH); Asif Iqbal, Widnau (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 156 days.

(21) Appl. No.: 14/238,175

(22) PCT Filed: Jul. 27, 2012

(86) PCT No.: PCT/EP2012/064832
§ 371 (c)(1),
(2), (4) Date: Feb. 10, 2014

(87) PCT Pub. No.: WO2013/020845
PCT Pub. Date: Feb. 14, 2013

(65) Prior Publication Data
US 2014/0190025 A1     Jul. 10, 2014

(30) Foreign Application Priority Data
Aug. 11, 2011 (EP) ..................................... 11177306

(51) Int. Cl.
*G01C 5/00* (2006.01)
*G01C 15/00* (2006.01)
(Continued)

(52) U.S. Cl.
CPC ................ *G01C 5/00* (2013.01); *G01C 15/002* (2013.01); *G08C 17/00* (2013.01); *H04Q 9/00* (2013.01); *G08C 2201/32* (2013.01); *G08C 2201/71* (2013.01); *H04Q 2209/75* (2013.01)

(58) Field of Classification Search
CPC ...... G01C 5/00; G01C 15/004; G01C 15/002; G01C 15/02; G01C 1/02; G01C 15/105; G01B 2210/283; G01B 11/275
USPC ........................................... 33/290, 228, 227
See application file for complete search history.

(56) References Cited

U.S. PATENT DOCUMENTS

| | | | |
|---|---|---|---|
| 7,342,650 | B2 | 3/2008 | Kern et al. |
| 7,633,610 | B2 | 12/2009 | Walser |

(Continued)

FOREIGN PATENT DOCUMENTS

| | | |
|---|---|---|
| CN | 1688867 A | 10/2005 |
| CN | 1761855 A | 4/2006 |

(Continued)

OTHER PUBLICATIONS

European Search Report dated Jan. 13, 2012 as received in Application No. EP 11 17 7306.

*Primary Examiner* — Yaritza Guadalupe-McCall
(74) *Attorney, Agent, or Firm* — Maschoff Brennan (57) ABSTRACT

A surveying appliance for surveying targets has a targeting unit and a remote control unit for prompting changes in the orientation of the targeting unit, equipped with measurement functionality for determining a three-dimensional orientation of the remote control unit or for determining movements by the remote control unit. The surveying appliance also has an evaluation and control unit. The extent or speed of the changes in the orientation of the targeting unit can be scaled to corresponding changes in an orientation or speed of change of orientation of the remote control unit such that at least two targeting modes having different levels of transmission ratio are provided. The surveying appliance can be used with corresponding handheld, moving remote control units, computer program products for providing, controlling and performing a targeting functionality for the surveying appliance and methods for tracking and surveying targets using the surveying appliance.

20 Claims, 6 Drawing Sheets

(51) Int. Cl.
*G08C 17/00* (2006.01)
*H04Q 9/00* (2006.01)

(56) References Cited

U.S. PATENT DOCUMENTS

| | | | | |
|---|---|---|---|---|
| 8,024,144 | B2 * | 9/2011 | Kludas | G01C 15/00 382/100 |
| 8,368,875 | B2 | 2/2013 | Kludas et al. | |
| 9,175,956 | B2 * | 11/2015 | Fessler | G01B 11/00 33/290 |
| 2009/0105986 | A1 * | 4/2009 | Staab | G01C 15/002 702/151 |
| 2009/0138233 | A1 * | 5/2009 | Kludas | G01C 15/00 702/158 |
| 2011/0067250 | A1 * | 3/2011 | Kludas | G01C 1/04 33/301 |
| 2011/0235053 | A1 * | 9/2011 | Campagna | G01C 15/006 356/614 |
| 2011/0314684 | A1 * | 12/2011 | Hayes | G01C 15/004 33/228 |
| 2012/0130675 | A1 * | 5/2012 | Schorr | G01C 15/105 33/286 |
| 2013/0278752 | A1 * | 10/2013 | Schorr | G01C 11/00 348/95 |
| 2013/0293705 | A1 * | 11/2013 | Schorr | G01B 11/24 348/135 |
| 2014/0190025 | A1 * | 7/2014 | Giger | G01C 15/002 33/228 |
| 2015/0092183 | A1 * | 4/2015 | Dumoulin | G01C 15/004 356/4.07 |
| 2015/0185008 | A1 * | 7/2015 | Nishita | G01C 15/002 33/293 |

FOREIGN PATENT DOCUMENTS

| | | | |
|---|---|---|---|
| CN | 101636632 A | | 1/2010 |
| DE | 90 07 731 U1 | | 11/1994 |
| DE | 44 43 413 A1 | | 6/1996 |
| DE | 195 45 589 A1 | | 6/1997 |
| DE | 196 48 626 A1 | | 5/1998 |
| EP | 0 481 278 A1 | | 4/1992 |
| JP | 11-014358 A | | 1/1999 |
| JP | 2002-310657 A | | 10/2002 |
| JP | 2002310657 A | * | 10/2002 |
| JP | 2003-329453 A | | 11/2003 |
| JP | 2004 108 939 A1 | | 4/2004 |
| JP | 2004108939 A | * | 4/2004 |
| WO | 96/18083 A1 | | 6/1996 |
| WO | 2011/041884 A1 | | 4/2011 |

\* cited by examiner

SURVEYING APPLIANCE AND METHOD HAVING A TARGETING FUNCTIONALITY WHICH IS BASED ON THE ORIENTATION OF A REMOTE CONTROL UNIT AND IS SCALABLE

FIELD OF THE INVENTION

The invention relates to a surveying appliance for tracking and surveying spatial points on surfaces of a structure, particularly interiors of buildings, and to a hand held, mobile remote control unit for the surveying appliance, and to a computer program product for providing, controlling and carrying out a scalable sighting functionality for the surveying appliance. The invention furthermore relates to an associated method for tracking and surveying spatial points on surfaces of a structure by means of the surveying appliance.

The invention relates to a surveying appliance for tracking and surveying spatial points on surfaces of a structure, particularly interiors of buildings, and to a hand held, mobile remote control unit for the surveying appliance, and to a computer program product 15 for providing, controlling and carrying out a scalable sighting functionality for the surveying appliance. The invention furthermore relates to an associated method for tracking and surveying spatial points on surfaces of a structure by means of the surveying appliance.

BACKGROUND

The prior art discloses simple surveying appliances having a sighting device, with the aid of which a spatial point is sighted manually and the sighting direction is then altered manually to a next spatial point to be surveyed, for example by means of adjusting screws on a theodolite drive.

DE 196 48 626 discloses a method and an apparatus for area surveying with a laser rangefinder having a laser transmitter and a laser receiver. The laser rangefinder is mounted on a stand. The apparatus furthermore comprises a tilting and rotating device for orientation and direction measurement, a telescopic sight and also an electronic evaluation unit for angle data capture, distance data capture and data transfer to a computer. For surveying a space, the appliance is positioned at a central location in the space, from where all spatial and/or area corner points to be detected can be sighted and impinged upon by the laser beam. In accordance with the disclosure of DE 196 48 626, the spatial points to be surveyed are in this case each sighted individually, if appropriate—in the case of relatively large distance—with the observation being supported by means of a telescopic sight.

A similar apparatus and associated surveying method are disclosed in DE 44 43 413, the supplementary published patent application DE 195 45 589 and WO 96/18083, which claims the priority of DE 44 43 413. These describe a method and an apparatus for surveying and marking on distant lines, areas or in at least partly closed spaces. One or more relevant spatial points are surveyed according to in each case two solid angles and the distance relative to a reference location by means of a laser distance measuring appliance mounted in a cardan-type fashion. The laser distance measuring appliance can be swiveled about two mutually perpendicular axes equipped with goniometers. In accordance with one embodiment described in said documents, spatial points to be surveyed are headed for manually and marking points are calculated from the survey data, on the basis of a prescribed relative relation between surveying and marking, said marking points then being moved to automatically by the measuring and marking apparatus.

Known construction surveying appliances typically comprise a base, an upper part mounted so as to be able to rotate about an axis of rotation on the base, and a sighting unit, mounted so as to be able to swivel about a swivel axis, with a laser source, which is designed to emit a laser beam, and an imaging detector, for example equipped with an orientation indicating functionality for indicating an orientation of the sighting unit with respect to a spatial point as a sighting point, and also with a distance determining detector for providing a distance measuring functionality. By way of example, the orientation indicating functionality may be a reticle in the viewfinder of a camera as imaging detector.

Modern, automated construction surveying appliances furthermore comprise rotary drives, which make the upper part and/or the sighting unit drivable in a motorized manner, goniometers and, if appropriate, inclination sensors for determining the spatial orientation of the sighting unit, and also an evaluation and control unit, which is connected to the laser source, the distance determining detector and also the goniometers and, if appropriate, inclination sensors.

In this case, the evaluation and control unit is equipped, by way of example, with a display having input means for inputting control commands from a user on the display (e.g. touchscreen) or what is known as a joystick that is directable, for the purpose of altering the orientation of the sighting unit by directing the joystick, and for presenting an image from the imaging detector or the camera on the display, wherein the orientation of the sighting unit can be indicated by means of the orientation indicating functionality on the display, e.g. by means of overlaying. Functionalities are known in which the input means on the display are in the form of arrows, the marking and touching of which enable a user to alter the orientation of the sighting unit in a horizontal or vertical direction.

Computer technology reveals remote control units that are equipped with motion sensors and the movement of which is converted into an alteration in the position of what is known as a cursor or indicator arrow on a computer screen, in the form of what is known as a "computer mouse" or in the form of controllers for computer games.

The document JP 2004 108 939 A describes a system for controlling a total station by moving a remote control. The remote control unit contains acceleration and gravity sensors that detect movements by the remote control. The detected movements are converted into control commands and sent to the total station. What is not described in this case is scalability of the sensitivity level, i.e. of the transmission ratio between a movement by the remote control unit and a resultant speed and/or extent of the change in the orientation of the total station. The lack of scalability is particularly disadvantageous for fine orientation to a target.

SUMMARY

It is the object of the invention to provide a surveying appliance and an associated method for tracking and surveying spatial points on surfaces of a structure having improved functionality for changing the orientation of the sighting unit, which provides a user with increased operating convenience both for the coarse orientation to a target and for the fine alignment.

The subject of the invention is a surveying appliance for tracking and surveying spatial points on surfaces of a structure, particularly a building. The surveying appliance comprises a base and an upper part that is mounted so as to be to rotate about an axis of rotation within an angle range of an azimuthal or horizontal angle on the base. Arranged on the upper part is a sighting unit that is mounted so as to be able to swivel about a swivel axis within an angle range of an elevational or vertical angle and that is equipped with a laser source, which is designed to emit a laser beam, and a distance determining detector for providing a distance measuring functionality. Furthermore, the sighting unit comprises an imaging detector, particularly a camera, and an orientation indicating functionality for indicating an orientation of the sighting unit with respect to a spatial point as a sighting point.

Furthermore, the surveying appliance according to the invention comprises a hand-held, mobile or moving remote control unit. The remote control unit has a display for presenting the orientation of the sighting unit with respect to a sighted spatial point in an image from the imaging detector by means of the orientation indicating functionality. Furthermore, the remote control unit is equipped with a functionality for prompting changes in the orientation of the sighting unit.

Furthermore, the surveying appliance comprises a first and a second rotary drive that render the upper part and the sighting unit drivable or orientable in an angle of azimuth and an angle of elevation. A spatial orientation of the sighting unit relative to the base can be detected by means of two goniometers for determining the horizontal and vertical orientations, i.e. the angle of azimuth and the angle of elevation.

The surveying appliance is equipped with an evaluation and control unit for evaluating incoming commands and for controlling the surveying appliance. The evaluation and control unit is connected to the laser source, the distance determining detector and the goniometers in order to associate a detected distance with a corresponding orientation (i.e. angles of azimuth and elevation detected in the process) and hence to determine coordinates for spatial points. Furthermore, the evaluation and control unit is connected to the imaging detector, and the first and second rotary drives are connected directly or indirectly to the remote control unit.

In addition, the surveying appliance may be equipped with two inclination sensors, preferably with two spirit level sensors ("bubble sensors"), the measurement data from which are then likewise transmitted to the evaluation and control unit. Hence, it is additionally possible to determine the orientation of the sighting unit with respect to the gravitational field vector of the earth.

According to the invention, the remote control unit of the surveying appliance is equipped with a measuring functionality for determining a spatial orientation of the remote control unit and/or for determining changes in the spatial orientation of the remote control unit. Changes in the orientation of the sighting unit can be prompted in line with the orientation of the remote control unit, as a dynamic sighting functionality.

The remote control unit incorporates particularly sensors for determining a situation in the space and/or a change of situation of the remote control unit, as measuring functionality according to the invention. Suitable sensors for determining a situation in the space are firstly in particular electronic compasses, which are able to orient themselves to the magnetic field of the earth and to detect azimuthal angles about the swivel or vertical axis, and secondly inclination sensors, which recognize the direction of the gravitational force and are used to determine angles about the roll axis and about the pitch axis. Changes in the situation in the space can be detected particularly by means of acceleration sensors, rotation rate sensors and other inertial sensors.

The sum total of base, upper part rotatably mounted thereon and sighting unit, together with the associated rotary drives and goniometers and also possibly inclination sensors, is also referred to as a sensor unit below. The evaluation and control unit may be integrated in the sensor unit. In that case, the remote control unit is connected to the evaluation and control unit wirelessly or by cable, with the communication possibly being based on interchange of electronic and/or optical signals. Such a connection can operate wirelessly using Bluetooth, Infrared or Wifi, for example. Alternatively, the evaluation and control unit may also be incorporated in the remote control unit. In that case, the remote control unit is connected to the sensor unit wirelessly or by cable.

The remote control unit is equipped with acceleration sensors for determining changes in the orientation of the remote control unit, as a result of which it is possible to prompt corresponding changes in the orientation of the sighting unit. This allows relative matching of the orientation of the sighting unit to the orientation of the remote control unit. The orientation of the target axis of the sighting unit then follows a change in the orientation of the remote control unit or a movement with the remote control unit. By way of example, in accordance with this embodiment of the invention, an arm movement with the remote control unit from bottom left to top right prompts a horizontal rotation by the sighting unit to the right and an increase in the angle of elevation for the orientation thereof.

In addition, the remote control unit may also be equipped with further inertial sensors, for example a gyroscope. As is known to a person skilled in the art, the accelerations of the six degrees of freedom can in this case be measured as a rule using the following sensor types by the corresponding combination of a plurality of inertial sensors in an inertial measurement unit (IMU): three orthogonally arranged acceleration sensors (also referred to as translation sensors) detect the linear acceleration in the x or y or z axis. From this, it is possible to calculate the translational movement (and the relative position). Three orthogonally arranged rotation rate sensors (also referred to as gyroscopic sensors) measure the angular acceleration about the x or y or z axis. From this, it is possible to calculate the rotational movement (and the relative orientation).

Such inertial measurement units involving components based on microelectromechanical systems (MEMS), which inertial measurement units are in the form of miniaturized appliances or assemblies, are already sufficiently well known from the prior art and have for a long time been produced on a large scale.

This embodiment of the invention particularly facilitates prompting of changes in the orientation of the sighting unit, even when the operator is not situated next to the sensor unit and with his direction of view in the sighting direction thereof. The operator does not need to transform his perception of the orientation of the remote control unit to the sighting direction of the sensor unit. He can move freely in the space with the remote control unit, and the orientation of the sighting unit is reproduced in line with the movements of the remote control unit, regardless of the absolute orientation of remote control unit and sensor unit relative to one another.

In this case, changes in the orientation of the sighting unit can have their extent and/or their speed scaled to corresponding changes in an orientation or speed of change of orientation of the remote control unit, preferably on a user-definable basis. The sensitivity level or transmission ratio level of the orientation—which level is variably scalable as a result—is particularly advantageous in order to coarsely orient the measuring appliance to a target quickly at first, in a first sighting mode, and then to perform the fine orientation with lower sensitivity in a second sighting mode. The sensitivity level or transmission ratio level may preferably be adjustable in two or more stages or continuously by the operator.

This relative matching of the orientation of sighting unit and remote control unit, which is scalable in terms of the transmission ratio, and hence variable, is used to allow a very high level of accuracy and at the same time a high speed for adjusting the orientation of the sighting unit by moving the remote control unit.

In one preferred embodiment, the transmission ratio level may also be dependent on other values, such as the distance to the currently sighted target, for example by automatically heading for distant targets at a lower speed of change than for close targets in a sighting mode. This function can also preferably be selected by the operator.

The remote control unit may additionally be equipped with an angle measuring functionality, preferably on the basis of a compass, and also with inclination sensors, as a result of which the orientation of the sighting unit can be matched to a current azimuthal orientation and inclination of the remote control unit. This allows absolute matching of the orientation of the sighting unit to the orientation of the remote control unit. Advantageously, in accordance with this variant, changes in the orientation of the sighting unit can be prompted intuitively easily, particularly when the operator of the remote control unit is situated next to the sensor unit, in a direction of view aligned with the sighting direction of the sighting unit. However, the precision or resolution of orientation changes in the sighting unit is limited by the accuracy of the adjustability of the orientation of the remote control unit.

Advantageously, such an embodiment with absolute matching of the orientation of remote control unit and sensor unit with sighting unit may be activatable or deactivatable, for example by reproducing the orientation of the remote control unit by virtue of corresponding changes in the orientation of the sighting unit so long as an input means on the remote control unit, such as a control button, is pressed by the operator during the movement of the remote control unit.

In general, it is preferred that the remote control unit is equipped with an input capability for an operator that can be used to activate or deactivate changes in the orientation of the sighting unit in line with the spatial orientation of the remote control unit. The display of the remote control unit may be in the form of a touchscreen on which commands from a user can be input by touch.

It is furthermore advantageous if changes in the orientation of the sighting unit in accordance with changes in the orientation of the remote control unit can be prompted in the same direction as or in the opposite direction from the latter, in particular by means of an input capability that can be activated by a user on the remote control unit.

It is likewise possible to use a two-part remote control unit, for example such that one part of the remote control unit, which is held in the hand, contains measuring functionality, particularly sensor components, in order to bring about changes in the orientation of the sighting unit as a result of changes in the orientation of this part, and the other part of the remote control unit provides the evaluation and control unit, a display, input means and also means for transmitting the data to the sensor unit.

It is furthermore advantageous if the orientation indicating functionality is designed to produce a reticle for indicating an orientation of the sighting unit with respect to a spatial point as a sighting point.

In addition, it is advantageous if the remote control unit and/or the sensor unit is/are equipped with a locating system, particularly a satellite-assisted locating system, for example with a GPS receiver.

A further subject of the invention is a hand-held, mobile remote control unit for a surveying appliance according to the invention based on one of the aforementioned embodiments. According to the invention, the remote control unit of the surveying appliance is equipped with a measuring functionality for determining a spatial orientation of the remote control unit and/or for determining changes in the spatial orientation of the remote control unit. Changes in the orientation of the sighting unit can be prompted in line with the orientation of the remote control unit, as a dynamic sighting functionality.

A subject of the invention is also a computer program product having program code, which is stored on a machine-readable storage medium, for providing, controlling and carrying out the dynamic sighting functionality of the surveying appliance according to the invention based on one of the aforementioned embodiments, particularly when the program is executed on an electronic data processing unit in the form of an evaluation and control unit of the surveying appliance.

A further subject of the invention is a method having a surveying appliance according to the invention based on one of the aforementioned embodiments for tracking and surveying spatial points on surfaces of a structure, particularly interiors of buildings.

The method involves the orientation of the sighting unit with respect to a sighted spatial point in an image from the imaging detector being presented by means of the orientation indicating functionality on the display of the remote control unit. The spatial orientation of the remote control unit and/or changes in the spatial orientation of the remote control unit is/are determined using a measuring functionality of the remote control unit. Changes in the orientation of the sighting unit are prompted in line with the spatial orientation of the remote control unit.

The remote control unit is equipped with acceleration and/or rotation rate sensors for determining changes in the orientation of the remote control unit, as a result of which it is possible to prompt corresponding changes in the orientation of the sighting unit. This allows relative matching of the orientation of the sighting unit to the orientation of the remote control unit. The orientation of the target axis of the sighting unit then follows a change in the orientation of the remote control unit or a movement with the remote control unit. By way of example, in accordance with this embodiment of the invention, an arm movement with the remote control unit from bottom left to top right prompts a horizontal rotation by the sighting unit to the right and an increase in the angle of elevation for the orientation thereof. In addition, the remote control unit may also be equipped with further inertial sensors, for example a gyroscope.

The remote control unit may additionally be equipped with an angle measuring functionality, preferably on the basis of a compass, and also with inclination sensors, as a result of which the orientation of the sighting unit can be matched to a current azimuthal orientation and inclination of the remote control unit. This allows absolute matching of the orientation of the sighting unit to the orientation of the remote control unit. Advantageously, in accordance with this variant, changes in the orientation of the sighting unit can be prompted intuitively easily, particularly when the operator of the remote control unit is situated next to the sensor unit, in a direction of view aligned with the sighting direction of the sighting unit. However, the precision or resolution of changes of orientation of the sighting unit is limited by the accuracy of the adjustability of the orientation of the remote control unit.

BRIEF DESCRIPTION OF THE DRAWINGS

The surveying appliance according to the invention and the method according to the invention for tracking and surveying spatial points on surfaces of a structure are described in more detail below, purely by way of example, with reference to specific exemplary embodiments that are shown schematically in the drawings, with further advantages of the invention being discussed too. Specifically.

Figure 1:
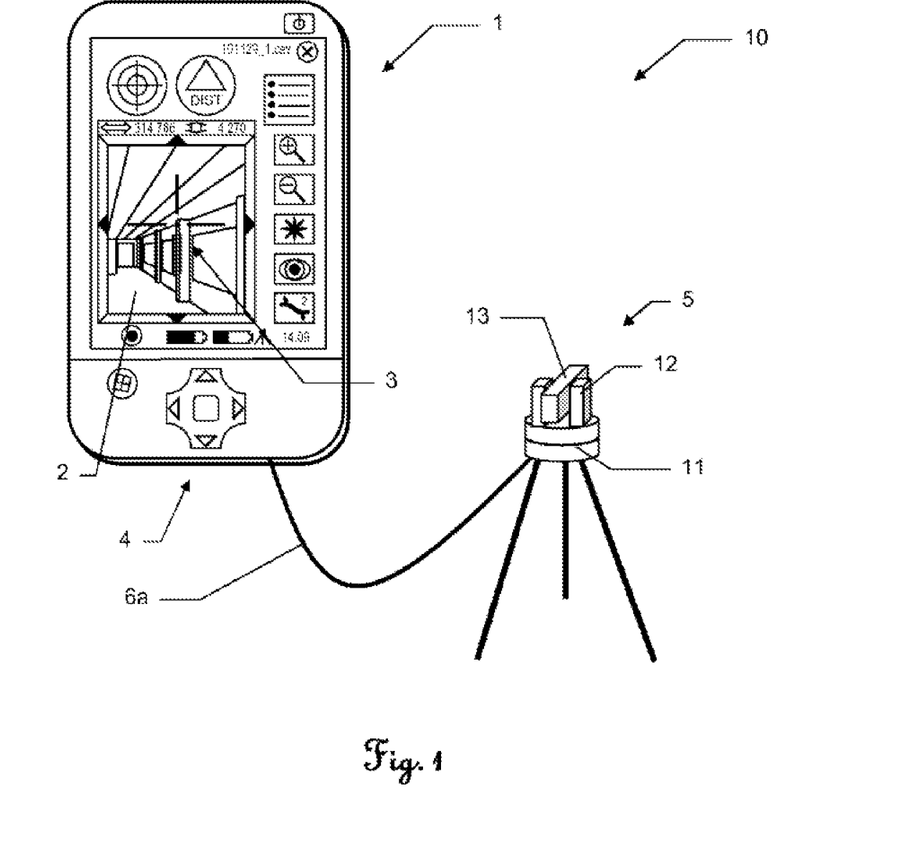
FIG. 1 illustrates a first embodiment of a surveying appliance according to the invention for tracking and surveying spatial points on surfaces of a structure, particularly interiors of buildings.

FIG. 1 illustrates a surveying appliance 10 according to the invention for tracking and surveying spatial points on surfaces of a structure, particularly interiors of buildings.

DETAILED DESCRIPTION

The surveying appliance 10 comprises a base 11, which is in the form of a tripod in this example, with an upper part 12 that is mounted so as to be able to rotate thereon. A sighting unit 13 that is mounted so as to be able to swivel on the upper part 12 is equipped with a laser source that is designed to emit a laser beam and with a laser light detector as a distance determining detector and therefore provides a distance measuring functionality. Furthermore, the sighting unit 13 comprises an imaging detector, particularly a digital camera, and an orientation indicating functionality for indicating an orientation of the sighting unit 13 with respect to a spatial point as a sighting point.

Furthermore, the surveying appliance 10 according to the invention comprises a hand-held, mobile remote control unit 1. The remote control unit has a display 2 for presenting, for example by means of a reticle 3, the orientation of the sighting unit 13 with respect to a sighted spatial point in an image from the imaging detector by means of the orientation indicating functionality. Furthermore, the remote control unit 1 is equipped with a functionality for prompting changes in the orientation of the sighting unit 13.

A first and a second rotary drive render the upper part 12 and the sighting unit 13 drivable or orientable in an angle of azimuth and an angle of elevation. The spatial orientation of the sighting unit 13 relative to the base 11 can be detected by means of two goniometers. In addition, inclination sensors may be provided for determining the orientation relative to the gravitational field vector of the earth. The sum total of base 11, upper part 12 mounted so as to be able to rotate thereon and sighting unit 13, together with the associated rotary drives and goniometers and also possibly inclination sensors, is also referred to as a sensor unit 5 below.

Furthermore, the surveying appliance 10 comprises an evaluation and control unit 4. This is connected to the laser source, the laser light detector and the goniometers and possibly to the inclination sensors in order to associate a detected distance and detected angle of azimuth and angle of elevation with a corresponding orientation of the sighting unit 13 and hence to determine coordinates for spatial points. Furthermore, the evaluation and control unit 4 is connected to the imaging detector, and the first and second rotary drives are connected directly or indirectly to the remote control unit 1.

Figure 2:
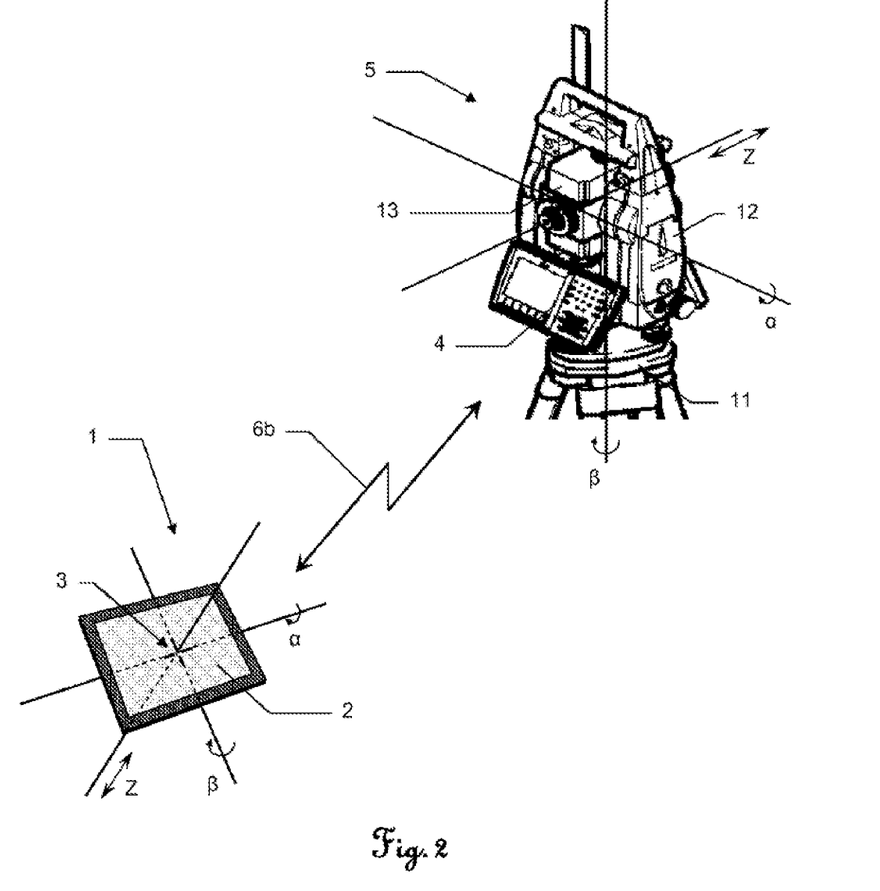
FIG. 2 illustrates a second embodiment of a surveying appliance according to the invention.

The evaluation and control unit 4 may, in line with the presentation shown in FIG. 1, be incorporated in the remote control unit 1. Alternatively, the evaluation and control unit 4 may also, as shown in FIG. 2, be incorporated in the sensor unit 5. In the first case, the remote control unit 1 is connected to the sensor unit 5, and in the second case it is connected to the evaluation and control unit 4 of the sensor unit 5. The connection can be made by cable 6a or by means of a wireless connection 6b, for example by means of Bluetooth.

According to the invention, the remote control unit 1 of the surveying appliance 10 is equipped with a measuring functionality for determining changes in the spatial orientation of the remote control unit 1 and preferably also for determining a spatial orientation of the remote control unit 1. As a dynamic sighting functionality, changes in the orientation of the sighting unit 13 can be prompted in line with the orientation change or the orientation of the remote control unit 1.

The remote control unit 1 is equipped with acceleration sensors for determining changes in the orientation of the remote control unit 1, as a result of which it is possible to prompt corresponding changes in the orientation of the sighting unit 13. This allows relative matching of the orientation of the sighting unit 13 to the orientation of the remote control unit 1. The orientation of the target axis of the sighting unit 13 then follows a change in the orientation of the remote control unit 1 or a movement with the remote control unit 1. This is illustrated with reference to FIGS. 3a and 3b. By way of example, in accordance with this embodiment of the invention, an arm movement with the remote control unit 1 from bottom left to top right prompts a horizontal rotation by the sighting unit 13 to the right and an increase in the angle of elevation for the orientation thereof.

Figure 3A:
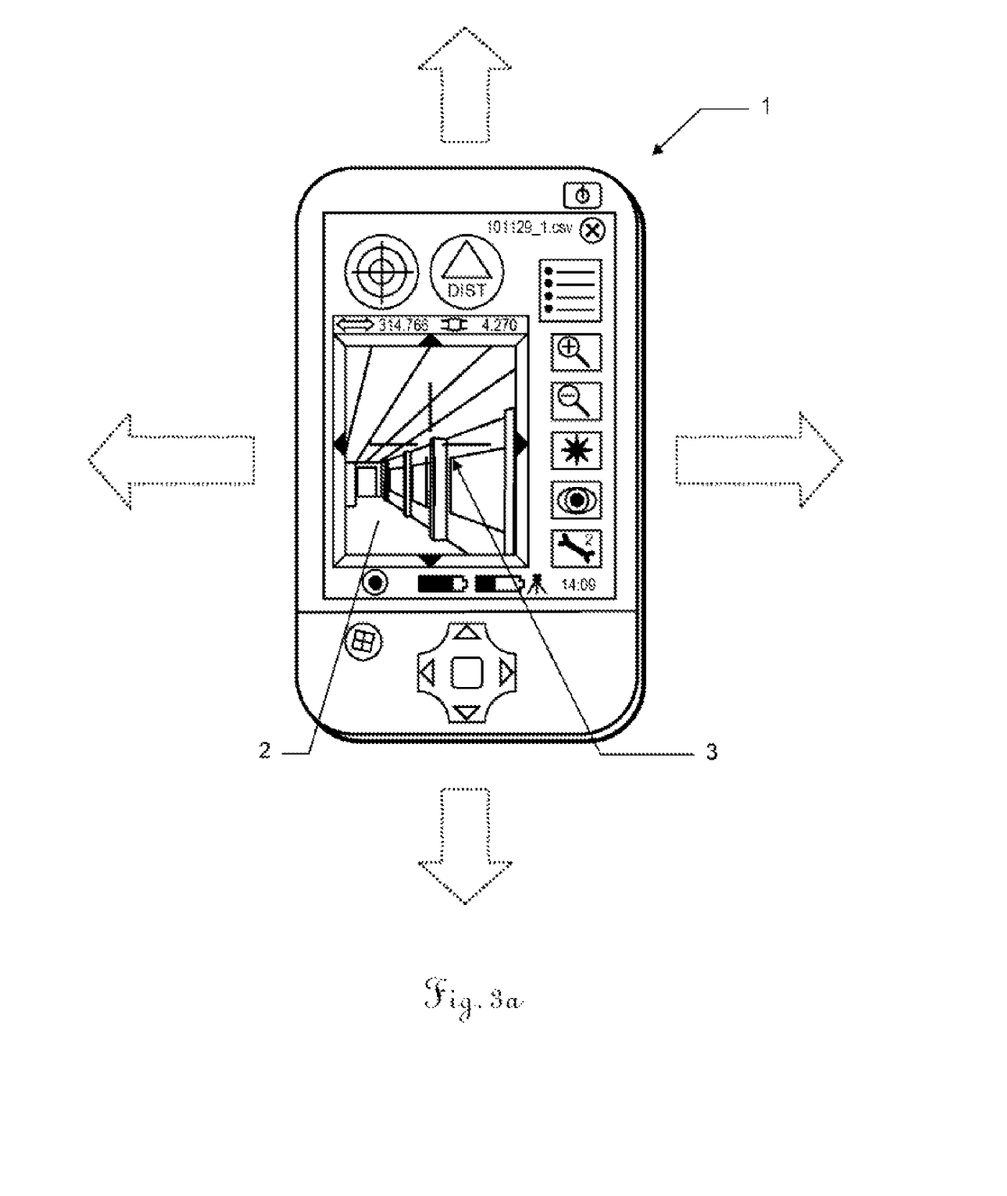
FIGS. 3a and 3b illustrate the manner of operation of the dynamic sighting functionality of the surveying appliance according to the invention and of the associated surveying method according to the invention.

Therefore, FIG. 3a uses arrows to illustrate movements by the remote control unit 1 in a vertical and a horizontal direction, which can prompt corresponding changes in the orientation of the sighting unit 13 in a vertical or horizontal direction.

Figure 3B:
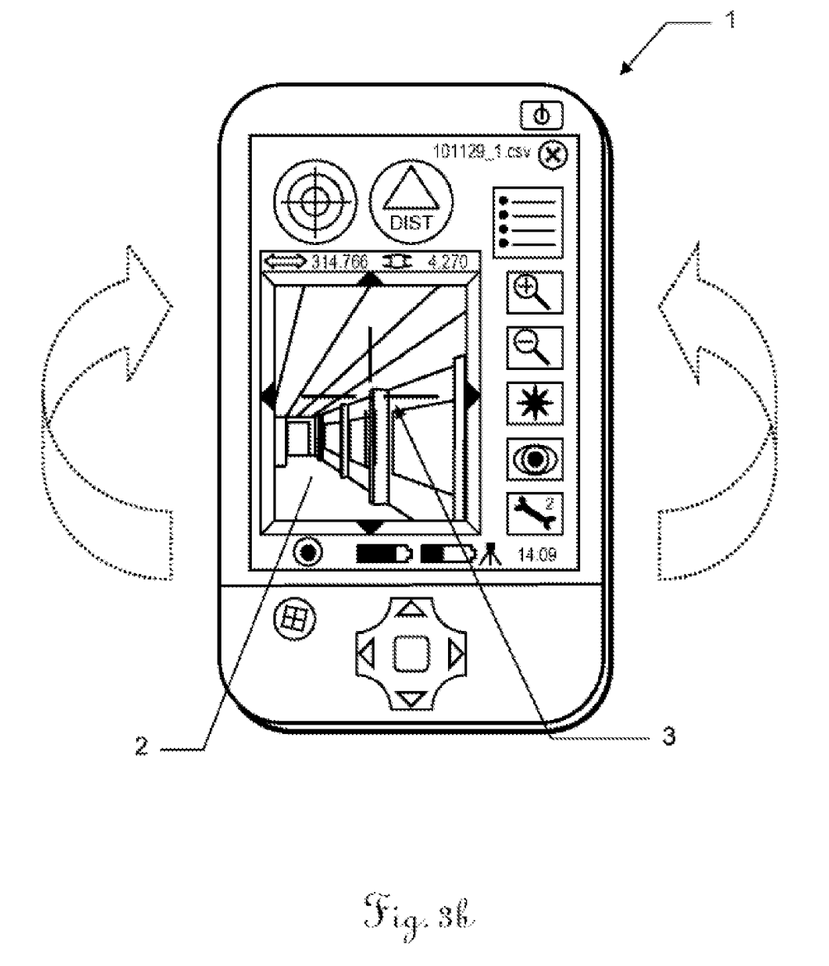

Similarly, FIG. 3b illustrates rotary movements with the remote control unit 1 that are able to be converted into corresponding rotations for the orientation of the sighting unit 13.

Figure 4A:
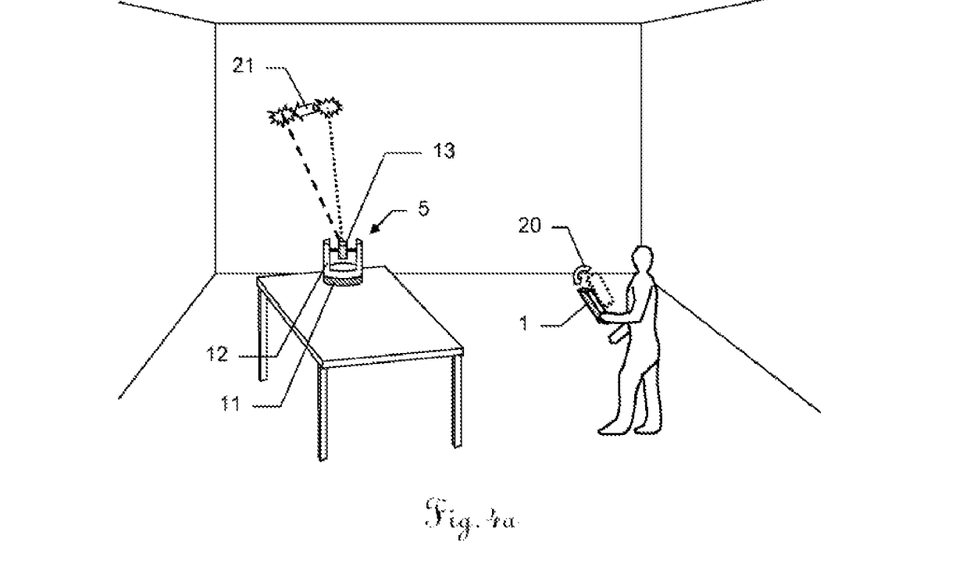
FIGS. 4a and 4b illustrate the manner of operation of the scalable transmission ratio level of the construction surveying appliance according to the invention and of the associated surveying method according to the invention.
Figure 4B:
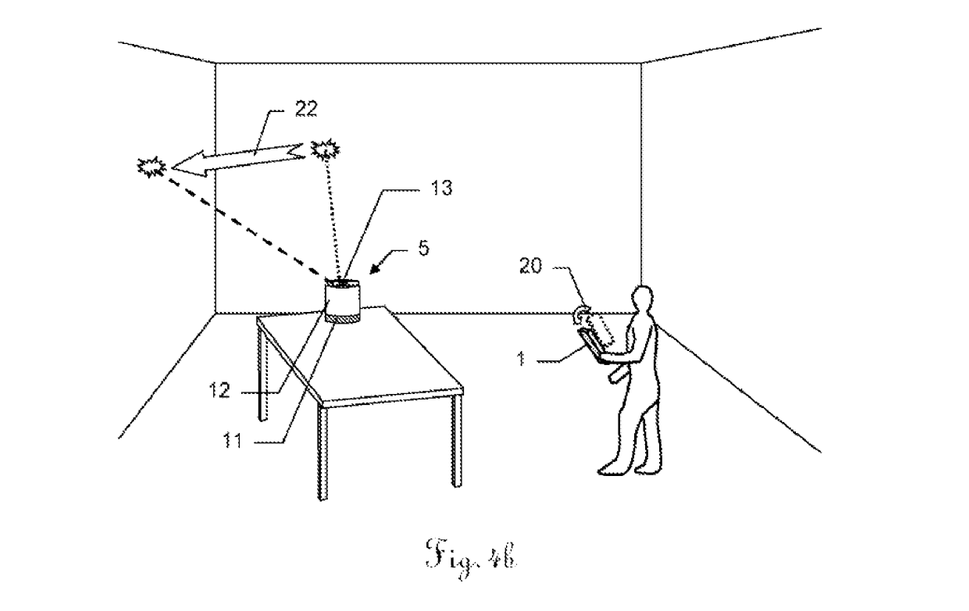

Changes in the orientations of the sighting unit 13 can have their extent and/or their speed scaled to corresponding changes in an orientation or speed of change of orientation of the remote control unit 1, so that at least two sighting modes that differ from one another in terms of the transmission ratio level are provided. This is shown in FIGS. 4a and 4b. Preferably these changes in the transmission ratio can be scaled both in an azimuthal direction and in an elevational direction, the scalability preferably being definable by the user. This scalability of the transmission ratio with a plurality of sighting modes allows a very high level of accuracy for adjusting the orientation of the sighting unit 13 by moving the remote control unit 1. In FIG. 4a, the transmission ratio level has been scaled such that the movement 20 of the remote control unit 1 prompted by the user brings about a change of orientation of the sighting unit 13 that results in a movement 21 of the sighting point. In FIG. 4b, the same movement 20 by the remote control unit 1 brings about a larger change of orientation of the sighting unit 13 that results in a movement 22 of the sighting point.

Advantageously, an automatic scaling function is additionally or alternatively provided for the transmission ratio, for which scaling function the extent and/or the speed of a change of orientation of the sighting unit 13 is dependent on the distance to the sighted target point. This automatic distance-dependent scaling function is preferably configured to be connectable and disconnectable by the user.

The remote control unit 1 may be equipped with an angle measuring functionality, preferably on the basis of a compass, and also with inclination sensors, as a result of which it is possible to match the orientation of the sighting unit 13 to a current azimuthal orientation and inclination of the remote control unit 1. This allows absolute matching of the orientation of the sighting unit 13 to the orientation of the remote control unit 1. Advantageously, in accordance with this variant, changes in the orientation of the sighting unit 13 can be prompted intuitively easily, particularly when the operator of the remote control unit 1 is situated next to the sensor unit 5, in a direction of view aligned with the sighting direction of the sighting unit 13. However, the precision or resolution of changes of orientation of the sighting unit 13 is limited by the accuracy of the adjustability of the orientation of the remote control unit 1. This functionality of absolute matching of the orientation of the sighting unit 13 to the orientation of the remote control unit 1 is not illustrated in the figures.

It is preferred for the remote control unit 1 to be equipped with an input capability for an operator that can be used to activate or deactivate changes in the orientation of the sighting unit 13 in line with the spatial orientation of the remote control unit 1. The input capability may preferably be provided by means of a display 2 that is in the form of a touchscreen. By way of example, operation of an input key on the remote control unit 1 could prompt the sensor unit 5 to adopt the values of the current azimuthal orientation and inclination of the remote control unit 1, measured using the compass and inclination sensors integrated in the remote control unit 1, and to match the orientation of the sighting unit 13 accordingly.

Advantageously, the remote control unit 1 or the evaluation and control unit 4 has a gesture recognition function that can interpret certain, in particular preset or user-defined, movements and/or movement sequences by the remote control unit 1 as a control command.

Advantageously, the remote control unit 1 is furthermore equipped with a feedback mechanism, for example with a vibration mechanism, that can be used to indicate information about the state of the remote control unit 1 and/or the sensor unit 5 or about the state of the communication between remote control unit 1 and sensor unit 5 to an operator.

In combination with known precautions for target identification, such as the identification of a reflective prism situated in range of the sighting unit 13, or pattern recognition for typical features, such as target marks, survey points, room corners and edges, the dynamic sighting functionality described above, on the basis of the orientation of the remote control unit 1, allows the process of sighting various spatial points to be substantially simplified, in comparison with the apparatuses and methods described at the outset from the known prior art.

Figure 5:
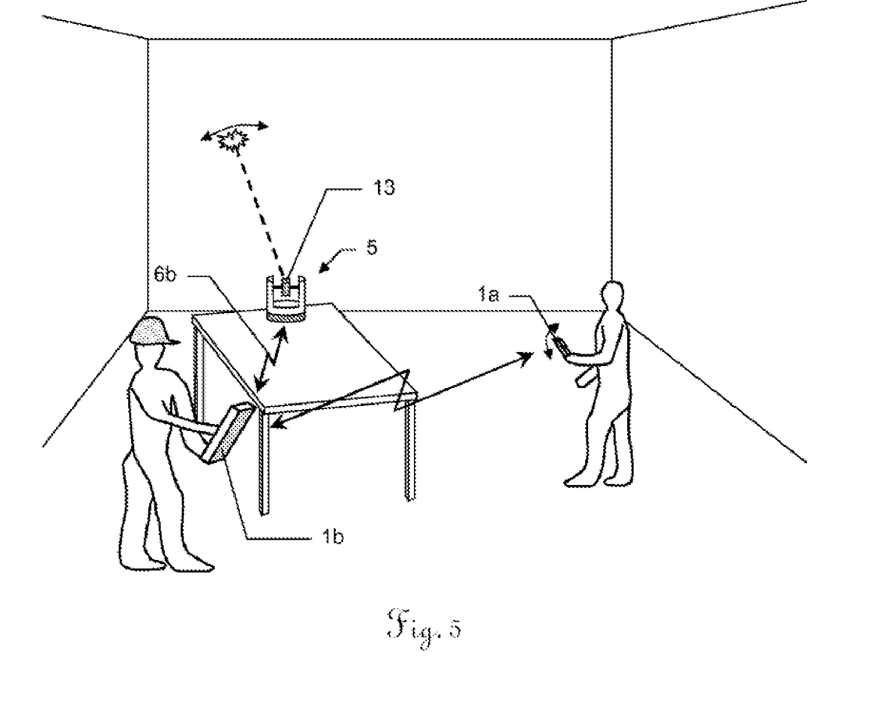
FIG. 5 illustrates a third embodiment of a surveying appliance according to the invention with a two-part remote control unit.

FIG. 5 shows a further embodiment of the invention. In this embodiment, the remote control unit comprises two separate parts 1*a* and 1*b*. The first part 1*a* of the remote control unit contains the measuring functionality, particularly sensor components, in order to bring about changes in the orientation of the sighting unit as a result of changes in the orientation of this part. The second part 1*b* of the remote control unit provides the evaluation and control unit, a display, input means and also means for transmitting the data to the sensor unit. The data can be transmitted between the two parts 1*a*, 1*b* of the remote control unit and the sensor unit 5 both by cable and, as shown in FIG. 5, via a wireless connection 6*b*, for example by means of radio waves.

It goes without saying that the embodiments shown in the figures show only possible examples of the surveying appliance according to the invention. A person skilled in the art knows how illustrated details of the exemplary embodiments can be combined with one another in an appropriate manner. The various approaches can likewise be combined with one another and with other surveying appliances from the prior art.

What is claimed is:

1. A surveying appliance for surveying target points, comprising:
   a sensor unit that includes:
      a laser source;
      a distance determining detector;
      a sighting unit that is mounted so as to be able to swivel about a swivel axis on an upper part that is mounted so as to be able to rotate about an axis of rotation on a base; and
      a first and a second rotary drive that render the upper part and the sighting unit drivable and orientable;
   a remote control unit for prompting changes to the orientation of the sighting unit and equipped with a measuring functionality for determining a spatial orientation of the remote control unit and for determining movements by the remote control unit; and
   an evaluation and control unit; wherein,
      a spatial orientation of the sighting unit relative to the base is detected by means of two goniometers;
      the evaluation and control unit is connected to the laser source, the distance determining detector and the goniometers to associate a detected distance with a corresponding orientation and hence to determine coordinates for target points; and
      the changes in the orientation of the sighting unit in an azimuthal and elevational direction have their extent and their speed scaled to corresponding changes in an azimuthal and elevational orientation or speed of change of orientation of the remote control unit such that at least two sighting modes that differ from one another at least in terms of a transmission ratio level are provided.

2. The surveying appliance as claimed in claim 1, wherein: scaling of the transmission ratio and of the extent and the speed of the change of orientation of the sighting unit is user-definable by adjustment of the remote control unit.

3. The surveying appliance as claimed in claim 1, wherein: scaling of the transmission ratio and of the extent and the speed of the change of orientation of the sighting unit is dependent on a distance between the sighting unit and a target point.

4. The surveying appliance as claimed in claim 3, wherein: scaling of the transmission ratio and of the extent and the speed of the change of orientation of the sighting unit is user-definable by adjustment of the remote control unit.

5. The surveying appliance as claimed in claim 1, wherein: the remote control unit includes compass and inclination sensors that is used to match the orientation of the sighting unit to a current azimuthal orientation and inclination of the remote control unit.

6. The surveying appliance as claimed in claim 1, wherein:
the remote control unit includes an inertial measuring unit with acceleration sensors and rotation rate sensors configured to determine changes in the orientation of the remote control unit, the inertial measuring unit enabling corresponding changes in the orientation of the sighting unit to be prompted.

7. The surveying appliance as claimed in claim 1, wherein:
the remote control unit has an input capability for an operator that is used to activate or deactivate changes in the orientation of the sighting unit in line with the spatial orientation of the remote control unit.

8. The surveying appliance as claimed in claim 1, wherein:
the sighting unit includes an imaging detector; and
the remote control unit includes a display for presenting the orientation of the sighting unit with respect to a target point in an image from the imaging detector.

9. The surveying appliance as claimed in claim 8, wherein:
the display is in the form of a touchscreen on which commands from a user is input by touch.

10. The surveying appliance as claimed in claim 1, wherein:
changes in the orientation of the sighting unit in accordance with changes in the orientation of the remote control unit are prompted in the same direction as or in the opposite direction from the latter.

11. The surveying appliance as claimed in claim 1, wherein:
said changes in the orientation of the sighting unit are prompted on a user-definable basis using an input capability on the remote control unit.

12. The surveying appliance as claimed in claim 1, wherein:
the sighting unit has an orientation-indicating functionality for indicating an orientation of the sighting unit with respect to a spatial point as a sighting point.

13. The surveying appliance as claimed in claim 1, wherein:
an orientation indicating functionality produces a reticle for indicating an orientation of the sighting unit with respect to a spatial point as a sighting point.

14. The surveying appliance as claimed in claim 1, wherein:
the evaluation and control unit are integrated in the remote control unit.

15. A hand held, mobile remote control unit configured for use with the surveying appliance of claim 1, the remote control unit comprising:
a display for presenting the orientation of the sighting unit with respect to a sighted spatial point in an image from an imaging detector using orientation indicating functionality; and
measuring functionality for determining at least one of:
a spatial orientation of the remote control unit; and
changes in the spatial orientation of the remote control unit.

16. A method for surveying target points using a surveying appliance having a sensor unit that includes:
a laser source;
a distance determining detector;
a sighting unit that is mounted for swiveling about a swivel axis on an upper part that is mounted for rotation about an axis of rotation on a base; and
a first rotary drive and a second rotary drive that render the upper part and the sighting unit drivable and orientable;
a remote control unit that is configured to prompt changes to the orientation of the sighting unit and has measuring functionality for determining a spatial orientation of the remote control unit and for determining movements by the remote control unit; and
an evaluation and control unit, wherein:
a spatial orientation of the sighting unit relative to the base is detected using two goniometers; and
the evaluation and control unit is connected to the laser source, the distance determining detector and the goniometers to associate a detected distance with a corresponding orientation and hence to determine coordinates for spatial points;
the method comprising:
determining the spatial orientation of the remote control unit and changes in the spatial orientation of the remote control unit using a measuring functionality of the remote control unit;
prompting changes in the orientation of the sighting unit in line with the spatial orientation and the changes in the spatial orientation of the remote control unit; and
scaling the transmission ratio between the changes in the orientation of the remote control unit and the changes in the orientation of the sighting unit in an azimuthal and elevational direction, such that at least two sighting modes that differ from one another at least in terms of a transmission ratio level are provided.

17. The method as claimed in claim 16, further comprising:
presenting the orientation of the sighting unit with respect to a target point in an image from an imaging detector of the sighting unit using an orientation indicating functionality on a display of the remote control unit.

18. The method as claimed in claim 16, wherein:
scaling of the transmission ratio, of the extent and the speed of the change of orientation of the sighting unit:
is adjustable on the remote control unit, and
is dependent on a distance between the sighting unit and a target point.

19. The method as claimed in claim 18, wherein:
scaling of the transmission ratio and of the extent and the speed of the change of orientation of the sighting unit is user-definable by adjustment of the remote control unit.

20. A computer program product having program code, which is stored on a non-transitory machine-readable storage medium and that performs the method of claim 16 when the program code is executed on an electronic data processing unit in the form of an evaluation and control unit of a surveying appliance.

* * * * *